H. A. MARTIN.
CASH REGISTER.
APPLICATION FILED JULY 5, 1913.

1,233,492.

Patented July 17, 1917.
6 SHEETS—SHEET 1.

Witnesses
Harry W. Lindsey Jr.
H. F. Sadgebury

Inventor
Haakon A. Martin
by R. E. Bloss
Chester H. Braselton
Attorneys

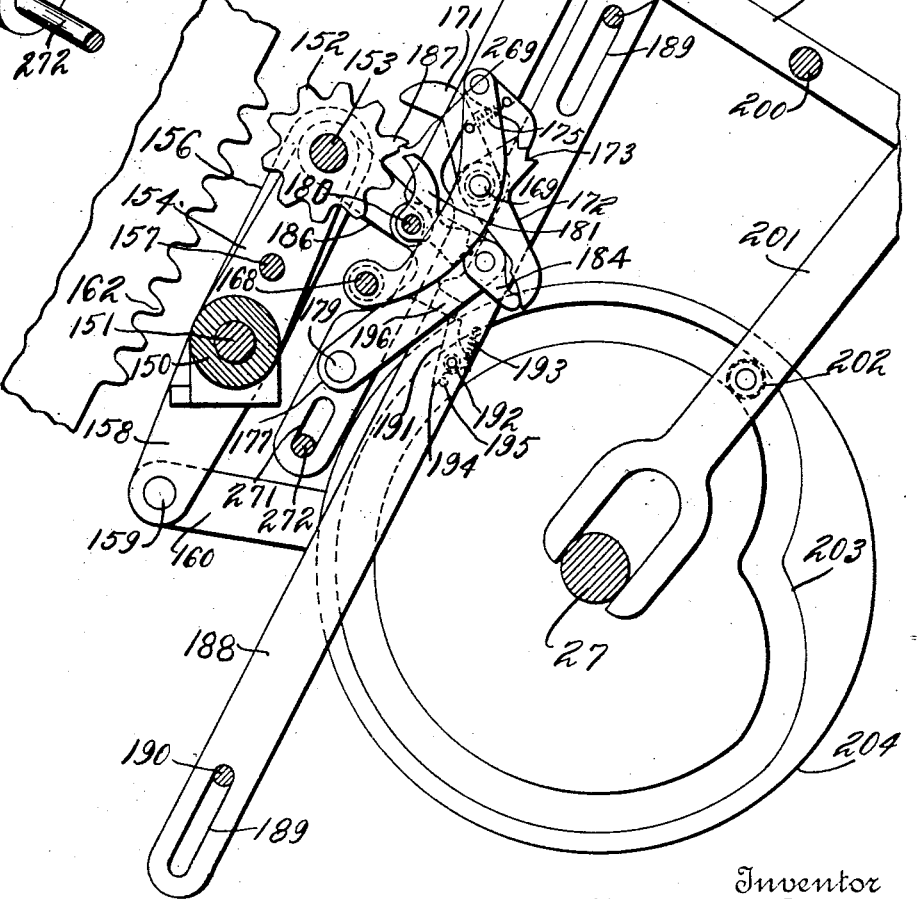

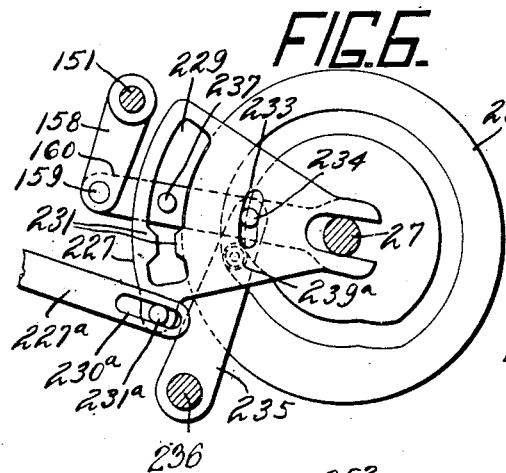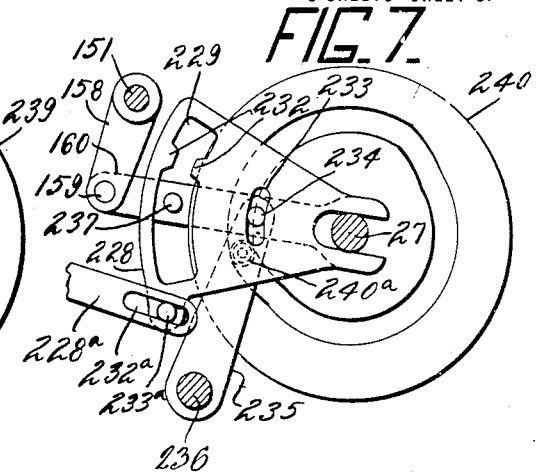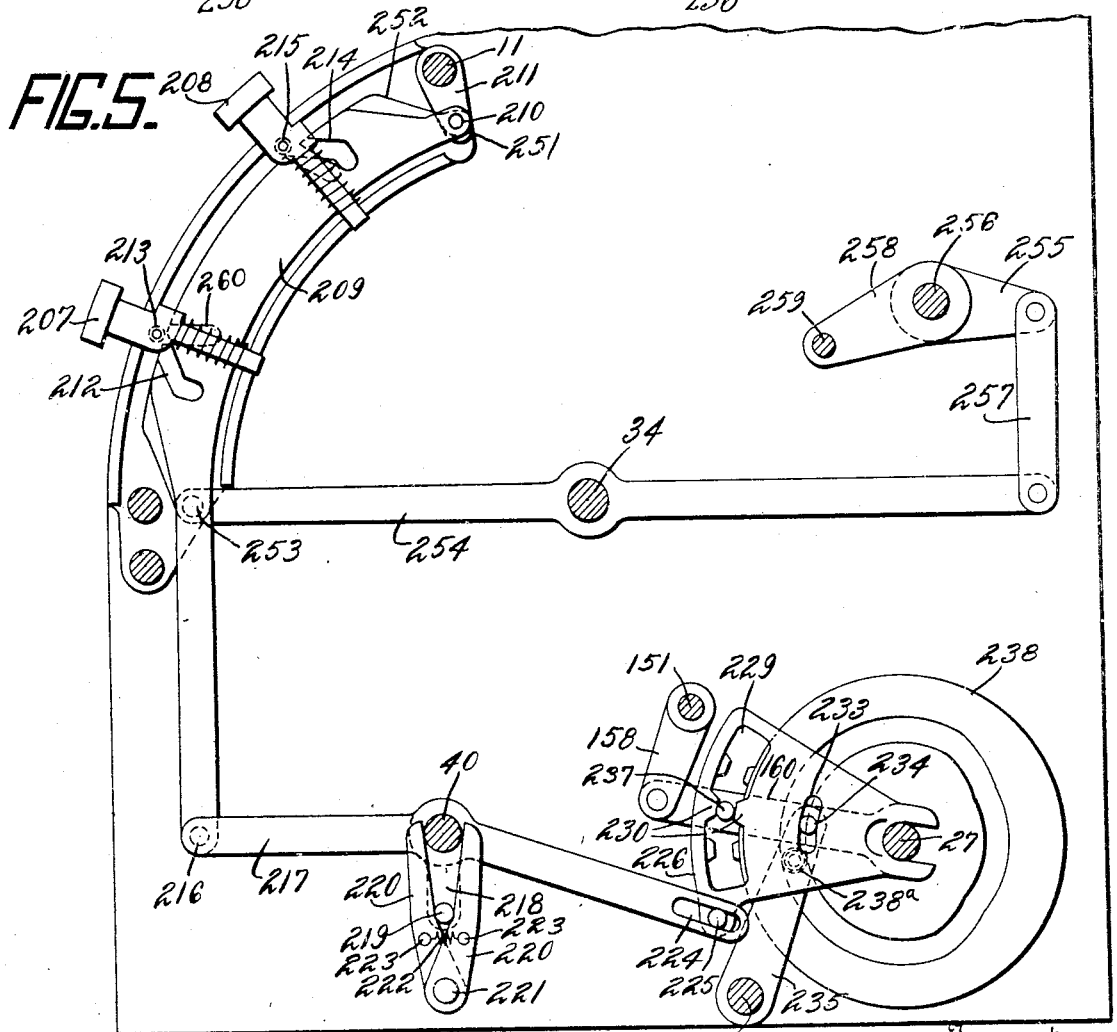

H. A. MARTIN.
CASH REGISTER.
APPLICATION FILED JULY 5, 1913.
1,233,492.
Patented July 17, 1917.
6 SHEETS—SHEET 4.
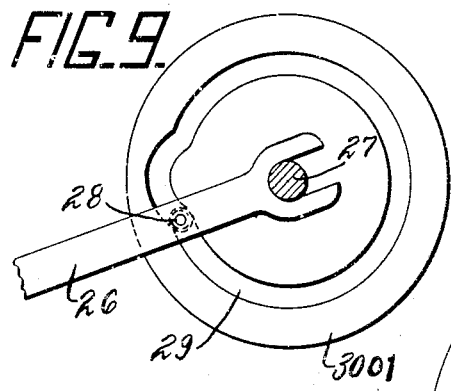
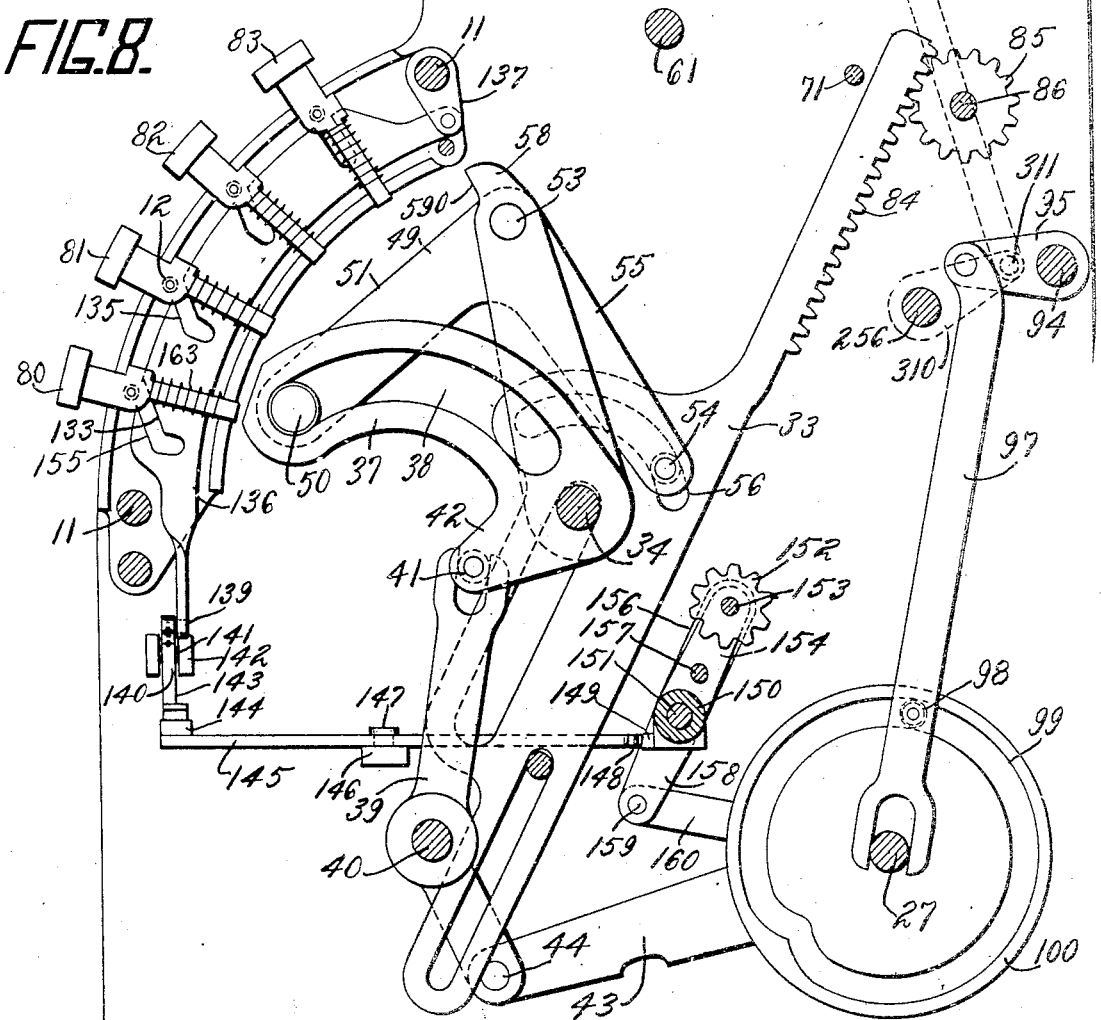
Witnesses
Harry W. Lindsey Jr.
H. F. Sadgebury
Inventor
Haakon A. Martin
by R. L. Glass
Chester H. Bracelen
Attorneys

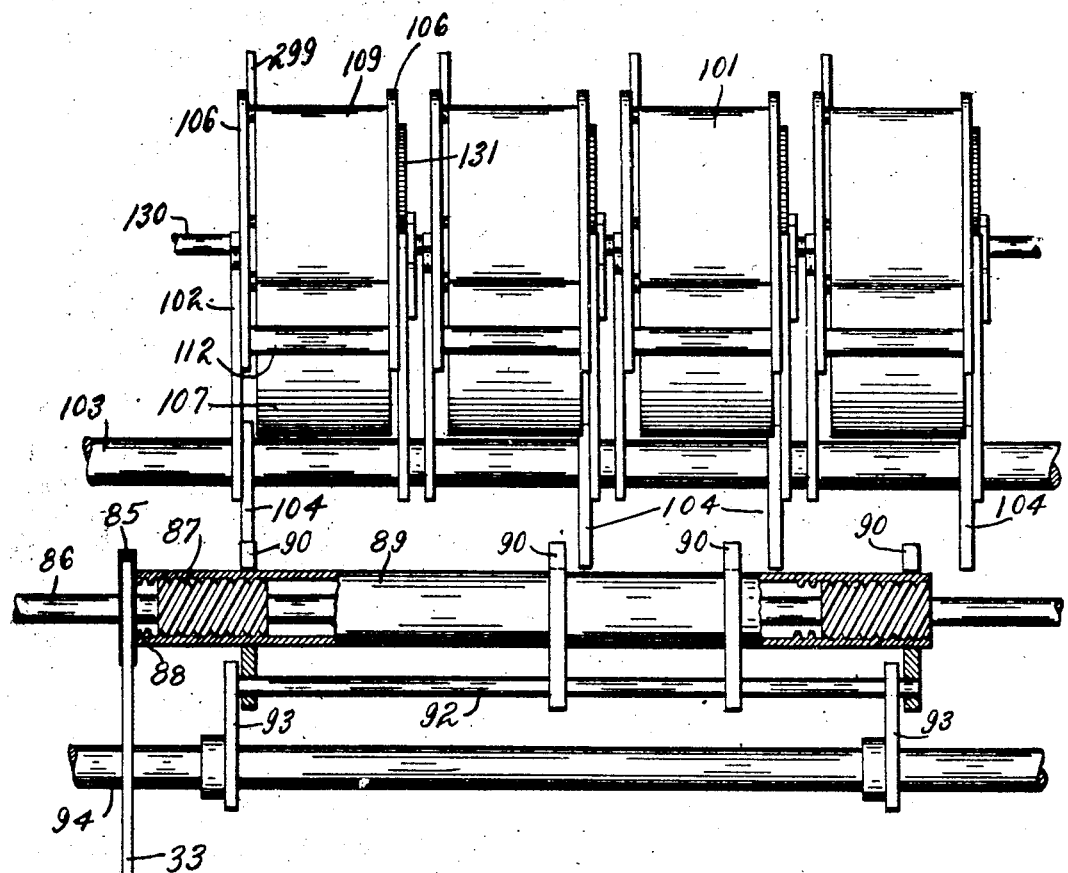
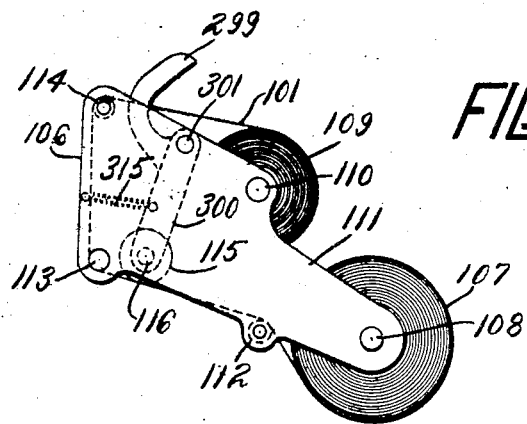

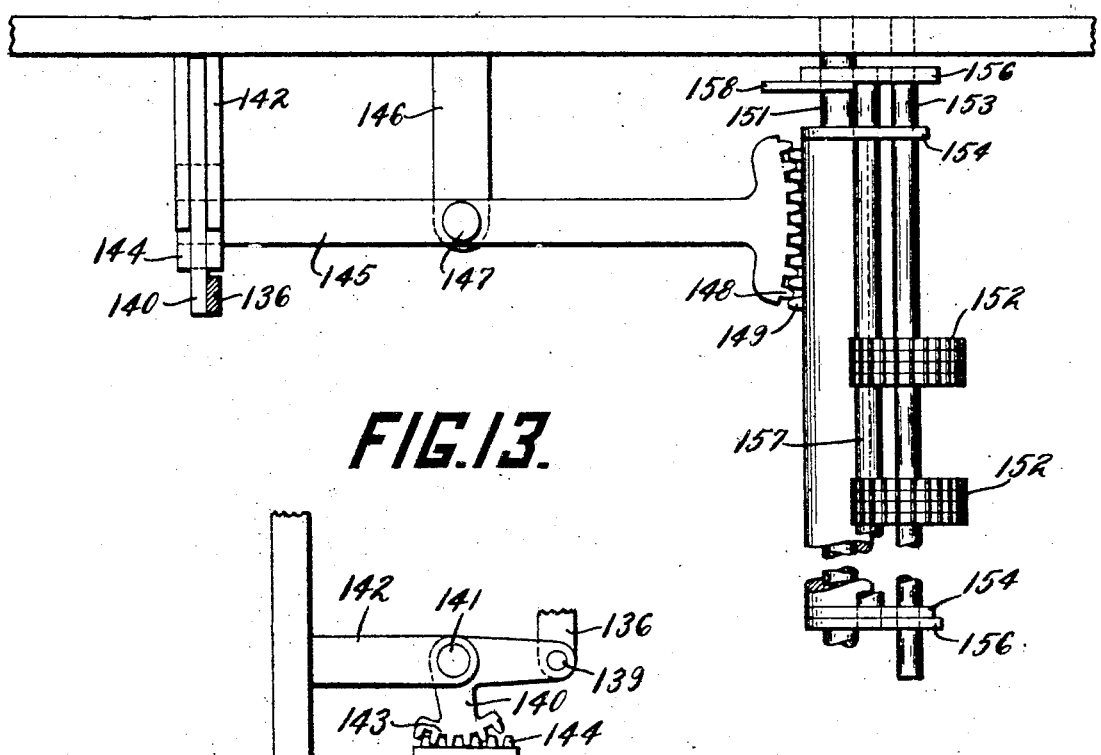
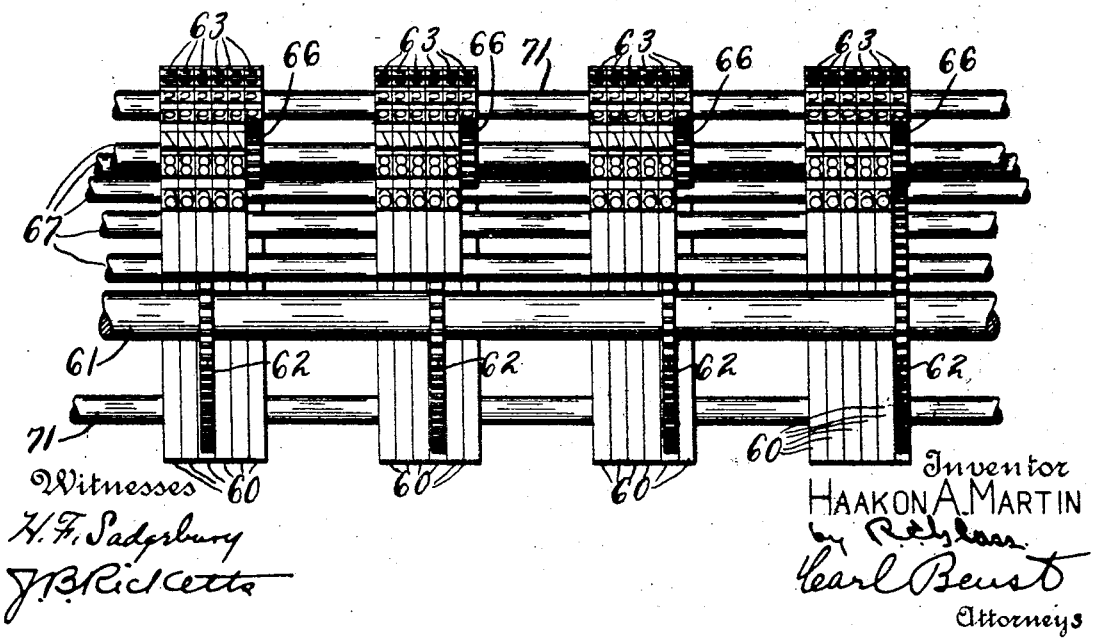

UNITED STATES PATENT OFFICE.

HAAKON A. MARTIN, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH-REGISTER.

1,233,492.  Specification of Letters Patent.  Patented July 17, 1917.

Application filed July 5, 1913. Serial No. 777,431.

*To all whom it may concern:*

Be it known that I, HAAKON A. MARTIN, a citizen of the United States, residing at Dayton, in the county of Montgomery and State of Ohio, have invented certain new and useful Improvements in Cash-Registers, of which I declare the following to be a full, clear, and exact description.

This invention relates to cash registers and is embodied in the multiple counter type of such machines and in a form requiring two distinct motions for a complete operation, the setting up of the keyboard and subsequently the rotation of the drive shaft either by a crank or motor.

One of the objects of the invention is to obtain a better form of key controlled differential mechanism, one which subjects the mechanism of the machine to less jars than the known forms and the operation of which is much smoother in action. In the illustrative form disclosed herein, this is accomplished by slotted arms actuated to constant extents at all operations, in the slots of which play pins carried by one arm of bell cranks pivotally carried at their center by differentially movable arms. The other arms of the bell cranks have pins working in slots in corresponding actuating slides and when the movement of the differentially movable arms is stopped by depressed keys the actuating slides begin movement to extents proportionate to the remaining angular movement of said arms.

It is also an object of the invention to provide mechanism for turning the totalizers to zero and printing the totals originally on the totalizers. In the preferred form shown in the drawings, this is accomplished by engaging the actuating slides with the totalizers on their forward movement, disengaging them at the end of such movement if the totalizers are to be left at zero and maintaining their engagement if they are to be left in their original position. Special "read" and "reset" keys are provided for controlling these operations and the depression of either of these keys also serves to release locking arms for engagement with the differentially movable arms above mentioned so that when the constantly movable arms of the differential mechanism are actuated the bell cranks will be swung on their pivotal connections with the differentially movable arms to move the actuating slides. Such operation continues until the movement of the slides is arrested by the return of their engaged totalizer pinions to zero which is accompanied by the lifting of the locking arms to release the corresponding differentially movable arms and allow the latter to move with the constantly movable arms throughout the remaining movement of the latter, such movement having no further effect upon the actuating slides. In this way these slides are moved in turn to zero operations proportional to the extents of their totalizer pinions move in passing to zero and as these slides are connected with the printing mechanism the latter will be set to print the amount originally on the totalizer.

A further object of the invention is to provide mechanism whereby the amounts entered in the various totalizers will be printed in a similarly classified manner and with this end in view the machine is supplied with a plurality of record strips with separate carrying frames and feeding mechanism therefor. A plurality of sets of printing type is also supplied all of which are accordingly set up in any operation. To take impressions from these type on the record strips the frames of the latter are moved to engage their strips with their corresponding sets of type but only one of these frames is adapted to be so operated at one operation, which movement of the frame is also accompanied by the feeding of the record strip. The selection of the record strip frame for actuation is done under the control of the transaction set of keys which also select the totalizers for operation. These keys to this end coöperate with differential mechanism similar to that of the amount banks, the differential movement of the actuating slide of which serves to differentially shift a sleeve which is rocked at each operation, to couple said sleeve selectively with arms on the record strip frames so that the desired frame will be rocked to take an impression on its record strip and feed the latter one step when the sleeve is subsequently rocked.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Fig. 3 is a view showing the transfer mechanism.

Fig. 4 is an enlarged view of a portion of the transfer mechanism.

Fig. 5 shows the special "read" and "reset" keys and their control over the counter engaging and the turn to zero mechanisms.

Figs. 6 and 7 illustrate respectively the "reset" and "read" cams.

Fig. 8 shows the transaction bank of keys and the differential mechanism therefor.

Fig. 9 is a detail of the cam employed to release the depressed keys at the end of the operation of the machine.

Fig. 10 shows the arrangement of the record strip frames and the selecting mechanism therefor.

Fig. 11 is an end view of one of the record strip frames.

Fig. 12, is a top plan view of the totalizer frame and the mechanism for shifting it differentially.

Fig. 13, is a front view of the shifting mechanism shown in Fig. 12.

Fig. 14 is a front elevation of the four sets of type carriers with the units carrier in each set broken away so as to show the driving connections.

Briefly stated, the invention in the form disclosed in the above drawings contemplates a cash register provided with a plurality of totalizers and a corresponding number of detail strips and sets of type carriers; actuating mechanism for the totalizer and the type carriers; and means for bringing any desired totalizer into operative relation with the actuating mechanism and for preparing the corresponding detail strip for actuation against its adjacent set of type carriers.

The transaction keys employed to select the totalizer upon which the amount of the transaction is to be added, and the detail strip upon which the items and the totals thereof are to be printed, are described herein as being assigned to different commodities such as "wine," "food," and "cigars," the fourth key being designated as the "void" key as it is assigned to transactions in which the purchase money is refunded for returned goods. This feature of the invention peculiarly adapts a machine, constructed in accordance with particular form embodied herein for use in hotels and restaurants as well as in cafés, delicatessen stores, and groceries, and in fact wherever different classes of commodities are sold. It is also clear that such a machine might be used to advantage in mercantile establishments which carry on a credit business, to segregate the transactions of different nature as for example by designating these keys as being "cash," "charge," "received on account," and "paid out" keys.

Figure 1:
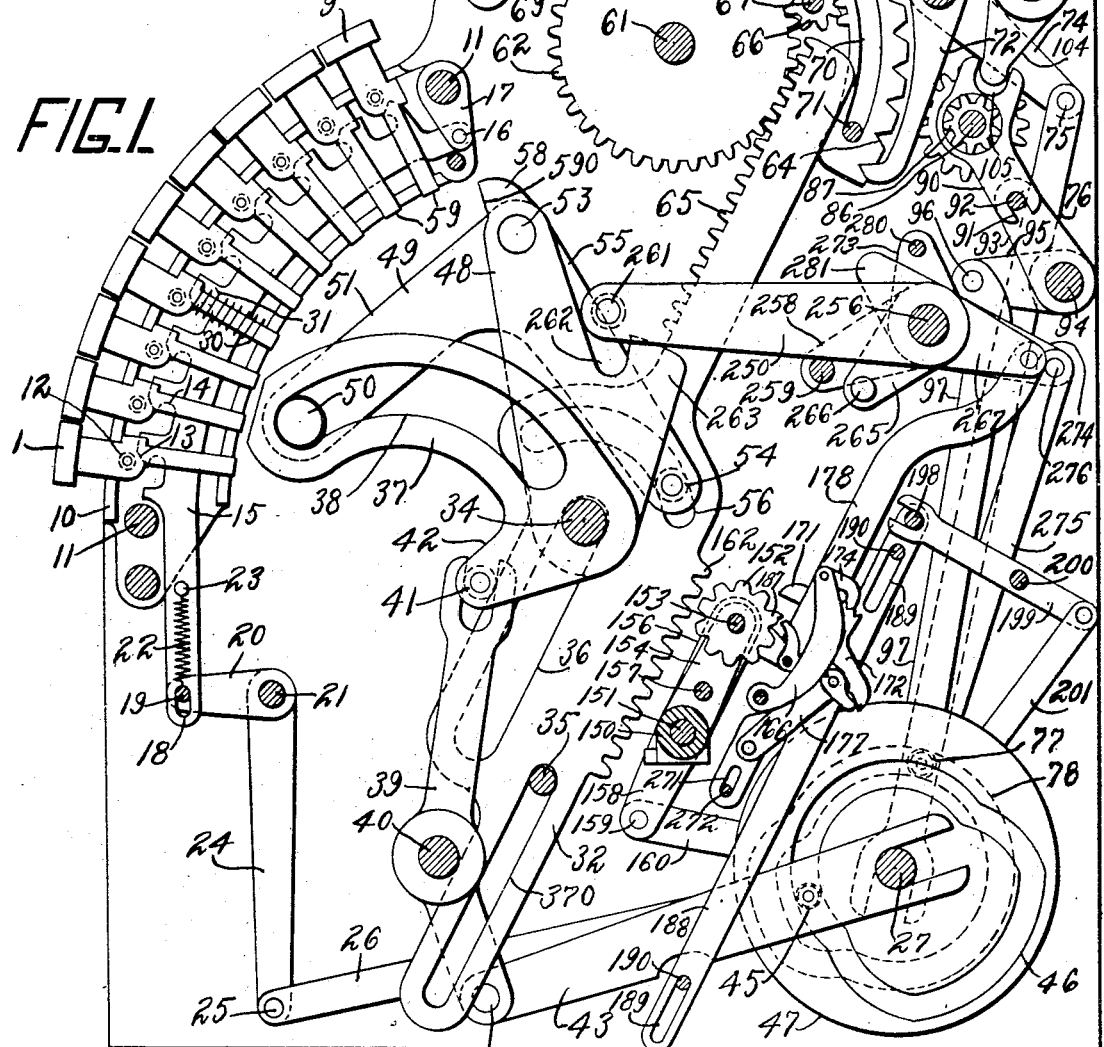
Figure 1 is a view in section taken at the side and looking in the direction of the right hand bank of amount keys.

As usual, there are nine keys, 1 to 9, provided for each amount bank and they are slidable in ways cut in the supporting frames 10, which in turn are supported by rods 11 extending longitudinally through the machine. Each of these keys is provided with a pin 12 normally in position to engage an inclined edge 13 of a recess 14 in a key locking detent 15, when a key is depressed (Fig. 1). The detent at its upper end is pivotally connected at 16 to a link 17 loosely mounted on the upper rod 11 and at its lower end has a slot 18 through which a bar 19 passes. Two arms 20, one at each end of the machine, are rigidly mounted on the shaft 21 and support at their outer ends the bar 19. The bar 19 passes through the slots 18 in the end of each detent and has secured thereto a spring 22 which is constantly under tension and tends to pull the detent downward, the other end of the spring being connected to a pin 23 on the detent. Beside each arm 20 and fast to the shaft 21 is a downwardly extending arm 24 pivoted at 25 to a pitman 26 which, at its rear end, is forked and straddles the main drive shaft 27 which is given one complete rotation clockwise as viewed in the drawings in any desired manner. The pitman 26 carries an anti-friction roller 28 playing in a cam groove 29 in the face of a disk 3001 rigidly mounted on the drive shaft 27 (Fig. 9). When a key is depressed the roller 12 engages the inclined face 13 and raises the detent 15 and after the roller passes out of engagement with this inclined edge 13 the setoff portion 31 of the recess 14 is pulled into operative relation with the roller 12 by the spring 22 and thereby locks the key in depressed position. The configuration of the cam groove 29 is such that at the end of one complete rotation of the drive shaft 27 the pitman 26 is given a forward movement raising the detents upward through the arms 20 and 24 thereby releasing the depressed keys which are restored to normal position by springs 30 coiled about their shanks. Detents similar to the detents employed to retain the amount keys in depressed position, are also used to lock the special keys, shown in Figs. 5 and 8, in depressed position but to preserve clearness in the drawings the detents are not shown.

The differential mechanism, which is controlled by the amount keys, sets up the type carriers, and the totalizers are arranged to be brought into engagement with the actuators included in the differential mechanism so that the elements of the totalizer will have imparted to them the differential movement of the actuators. The differential mechanism comprises a plurality of slidable actuating plates 32, one for each bank of denominational keys up to the full capacity of the machine. These actuating plates are mounted on the shaft 34 and the rod 35 which pass through slots 36 and 370 respectively, and guide the plates in their reciprocation. Arms 37, one for each plate, are rigidly mounted upon the shaft 34 supported by bearings in the side frame of the machine, and have cam slots 38 eccentric with the shaft 34. A lever 39 is pivotally mounted on a rod 40 supported by the side frames of the machine and is bifurcated at its upper end to straddle an anti-friction roller 41 extending laterally from the projection 42 of the cam arm 37. This lever at its lower end is pivoted by the pin 44 to a pitman 43 which, at its rear end, is forked over the main drive shaft 27 and carries a roller 45 riding in a cam groove 46 in the face of the disk 47 (Fig. 1). Upon each rotation of the drive shaft 27 the cam slotted arms 37 are given an invariable extent of movement through the oscillation of the lever 39 by the coöperation of the roller 45 on the pitman 43 in the groove 46. An arm 48, loosely mounted upon the shaft 34 has a bell crank lever 49 pivoted centrally to its upper end by a pin 53. An anti-friction roller 50 at the outer end of the forward arm 51 of this bell crank lever passes into the cam slot 38 of the arm 37 and an anti-friction roller 54 at the outer end of the other arm 55 of the bell crank lever plays in a slot 56 formed in the actuating plate 32 and normally concentric with the shaft 34. Above its pivotal center 53 on the bell crank the arm 48 is provided with a nose 58.

The operation of this differential mechanism just described is as follows: Depression of a key moves its shank 59 into the path of the nose 58 on the arm 48. When the main drive shaft 27 is given one rotation the cam slotted arm 37 is given an oscillatory movement of invariable extent. The supporting arm 48 and the bell crank lever 49 are given a bodily movement upon initial movement of the arm 37 the cam slot 38 being eccentric with the shaft 34. When the edge 590 of the nose 58 on the arm 48 abuts the shank 59 of the depressed key, the bell crank lever 49 is rocked about its pivot 53 as the arm 37 continues on to its extreme extent of movement, and thereby the roller 50 on the arm 51 of the lever is forced to move in the cam slot toward the shaft 34. This rocking of the bell crank lever 49 about 53 as a pivotal center moves the actuating plates differentially in an upward direction, proportionate to the remaining angular movement of the arms 37. It is therefore evident that the extent of differential movement of the actuating plate 32 is dependent upon the position of the particular key depressed in the corresponding bank, as the keys limit the bodily movement of the lever at different points of such movement and consequently cause the lever to oscillate in order to raise the actuating plate 32 differentially. For example, when the nine key, which is the uppermost key and represents the greatest value in each amount bank, is depressed the bell crank lever 49 will only have a short period of bodily movement with the cam slotted arm 37, but after such bodily movement with the arm is stopped by the shank of the depressed key, the bell crank lever will be given its greatest extent of oscillatory movement about its pivotal center 53 and the actuating plate 32 will therefore be given nine units of movement. When the lowest key in a bank is depressed the bell crank lever and the cam slotted arm 37 driving it will be moved as a unit until the nose 58 strikes the end of the key in its depressed position so that the bodily movement of the lever is greater in extent than it is when any of the other keys are depressed and the oscillatory movement of the lever on continued movement of the lever raises the actuating plate 32 but one step or unit. In this manner any desired differential movement will be imparted to the actuating slides by driving mechanism which has a constant movement.

As the machine in the form disclosed in the drawings is constructed to enter four different classes of amounts, four sets of type bars are provided and each set comprises as many type bars, as there are banks of keys. The curved type bars 60 are concentric with a rod 61 and on the forward end of their peripheries carry the type 63 and at their rear end have V shaped alining notches 64. A gear 62 loosely mounted on the rod 61 is provided for each bank of amount keys and meshes with the teeth 65 carried on the upper end of the outer edge of its adjacent actuating plate 32, and with a pinion 66 fast upon one of the six shafts 67 which are suitably mounted in bearings in the side frames of the machine. As six shafts 67 are shown in Fig. 1 it is evident that the machine shown in the drawings is constructed with six banks of amount keys. This pinion 66 for each of the lower order banks in turn meshes with the teeth 69 on the inner periphery of its corresponding type bar 60. Three more of these pinions are fast on each lower order shaft 67 and are arranged to mesh with the teeth 69 of the type bars of the same denomination in each set. Each of the two higher order shafts 67, however, has five of the pinions 66, one meshing with the corresponding gear 62 and the other four meshing with the teeth on the type bars 60 of the same denominational order. The reason that the higher order shafts have five pinions each is that, as will be understood from Fig. 14, the two higher order differential sections of the machine come too far to the left for their gears 62 to mesh with any of the pinions engaging directly with the type bars. The bars have semi-circular slots 70 also concentric with the shaft 61 and through which rods 71, supported by the side frames of the machine, pass so that when the key is depressed and the shaft 27 given one rotation, the type bars 60 will be differentially moved rearward through the meshing of pinions 66 with the teeth 69 as the gears 62 also meshing with the pinions 66 are differentially rotated upon movement of the actuating plates 32.

An alining plate 72 is provided to aline all of the type bars and is fast upon the shaft 73 suitably supported by bearings in the side frames of the machine. Fast to this same shaft 73 and at one end thereof, is an arm 74 pivoted at 75 to a pitman 76 (Fig. 1) which is bifurcated at its lower end and straddles the drive shaft 27. Carried by the pitman 76 is an antifriction roller 77 which plays in a cam groove 78 (shown in dotted lines) in a disk of the same diameter and to the left of the cam disk 47, on the shaft 27. After the cam slotted arms 37 have been given their greatest extent of movement in a counter-clockwise direction the cam groove 78, through the pitman 76 and the arm 74, rocks the alining plate 72 into engagement with the notches 64 in the type bars 60 which have been differentially positioned, and remain in such position until after a detail strip frame is actuated so that a perfect impression may be taken from a set of type bars on a record strip.

The detail strips and the transaction keys which are employed to select the detail strip frame which is to be rocked by the operating mechanism against its corresponding set of type bars are shown in Figs. 8 and 10 and will now be taken up in detail. As shown in Fig. 8, the differential mechanism controlled by these transaction keys is similar to that controlled by the amount keys so it is only necessary to describe the arrangement of the keys and the construction of the actuating slide 33, which in this case is employed to shift members for connecting the desired detail strip frame with a device employed to rock the members so that the selected detail strip will be lowered against its corresponding set of type bars. Keys 80, 81, and 82 will be described as being assigned to "food," "cigars," and "wines," respectively, and key 83 will be designated as the "void" key, as the purpose of having the latter key is to segregate transactions involving a refunding of money, as it is a common practice to refund money upon the return of an article sold or when the article is not of the quality represented. As these keys comprise one bank the actuating plate 33 will have but four different extents of movement dependent upon the key depressed. The plate 33 on its rear edge carries teeth 84 constantly meshing with a pinion 85 fast upon a shaft 86. Screw threads on the enlarged portions 87 of this shaft coöperate with threads 88 on the inner peripheries of each end of a sleeve 89 as shown in Fig. 10. Fast to this sleeve and differentially arranged thereon are four arms 90 which are employed to connect the desired detail strip frame with the operating mechanism, as will be presently explained. The lower ends of these arms 90 have notches 91 (Fig. 1) through which the bar 92 passes, the bar being supported at its ends by arms 93 fast to a shaft 94. Fast to the same shaft is an arm 95 pivoted at 96 to a pitman 97, which, at its lower end, as shown in Fig. 8, is forked over the drive shaft 27 and carries a roller 98 playing in the cam groove 99 constructed in the face of a disk 100 fast on the shaft 27.

As there are four transaction keys and therefore four sets of type bars, four detail strips 101 are provided. These detail strips are carried by frames 102 loosely mounted upon a transverse shaft 103. Rigid with the right hand side of each frame 102 is a downwardly extending arm 104 the outer end of which is normally in the path of notches 105 in the upper ends of the arms 90. The arms 90 are differentially arranged on the sleeve 89 so that when a transaction key is depressed and the machine operated one of the arms by the shifting of the sleeve is brought into operative relationship with its corresponding arm 104 projecting from the frame of the detail strip upon which the amounts of the class to which the depressed key is assigned are to be recorded. After the type bars 60 have been differentially positioned as explained and one of the arms 90 engaged with the selected detail strip frame the frame is oscillated by the reciprocation of the pitman 97 by the cam groove 99 and an impression is taken on the detail strip. As the sleeve 89 is slightly shifted upon such oscillation the upper ends of arms 90 are slightly thicker than the co-acting arms 104 to prevent a disengagement of the arms during such an oscillatory movement.

The detail strips 101 are carried on subframes 106 (Fig. 11). The supply roll 107 is loosely mounted on a rod 108 and the storage roll 109 on the shaft 110 and this rod and shaft connect the side plates 111 of the sub-frame 106. Such a frame is provided so that the detail strip may be readily replaced by another. The detail strip passes from the supply roll 107 and is guided by rollers 112, 113, and 114 to the storage roll 109. A platen 115 formed of any suitable resilient material is mounted on a rod 116 carried at the lower ends of arms 300. These arms are pivotally mounted between the plates 111 of the sub-frames, on a shaft 301 mounted in the side plates. The platen in each frame is normally adapted to have no movement relative to the sub-frame 106 as relative movement is prevented through the engagement of a finger 299 on the right hand side arm 300 with an arm 302 fast on a shaft 120 (Fig. 1). The purpose to be accomplished by having the platen frame constructed as just described will be fully explained hereinafter. The sub-frames 106 are firmly supported by the main frames 102 as the ends of the rod 108 which project through the side plates 111 rest in notches 303 and the ends of the rod 113 in notches 304 in the rear and forward ends respectively of the frames 102, and latches 305 pivoted at 306 to the frames 102 are hooked over the right hand ends of the rods 113 to prevent displacement of the sub-frames when actuated against their adjacent type carriers. A spring 117, under tension between a stud 118 on frame 102 and a rod 119 extending longitudinally through the machine tends to keep the detail strip out of contact with its adjacent type bars and the shaft 120 serves as an alining means to prevent the spring 117 from pulling the detail strip past its normal position. No ribbon feeding mechanism is shown in the accompanying drawings as such mechanism is not essential to the understanding of the invention and any one of several well known forms may be employed.

The complete operation of the printing mechanism just described is as follows: Amount keys and a transaction key are depressed and the main drive shaft 27 subsequently rotated. The differential movement given to the actuating plates 32 differentially positions all the type bars which correspond to the denominations of the banks in which the amount keys are depressed and after the time for the differential movement of the plates 32 has elapsed the alining plate 72 is rocked into engagement with the notches 64 of the type bars through the rocking of the shaft 73 by the cam groove 78. The transaction keys differentially position the actuating slide 33 and the sleeve 89 has imparted thereto this differential movement through the external screw threads of the shaft 86 which is rotated by movement of the slide 33 through engagement of the teeth 84 with the pinion 85 fast on the shaft. Such differential movement of the sleeve brings the proper arm 90 into operative relation with its adjacent arm 104 of the desired detail strip frame 102 and subsequently this selected detail strip is swung down into engagement with its type bars through the rocking of the shaft 94, as the rocking of this shaft, through the arms 93 connected to the arms 90 by the bar 92 rotates the sleeves 89 in a clockwise direction and thereby forces the platen 115 carried in the selected detail strip frame against its type carriers 60 to take an impression from the type on the desired detail strip.

The detail strip supply roll is advanced one step upon each return movement of its supporting frame 102 to bring a fresh surface of the strip into printing position and this is accomplished by the following device. A small bell crank lever 126 is pivoted at 127 to each detail strip frame 102 and at the forward end of one arm of this lever is a pawl 128 pivoted at 129. The other arm at its outer end is forked and straddles a transverse rod 130 supported by the side frames of the machine. A serrated wheel 131 is rigidly mounted on the left hand end of the shaft 110 supporting the storage roll 107 and the pawl 128 is constantly kept in engagement with the teeth of this ratchet wheel by the spring 132. When a frame 102 is rocked about its pivotal center 103, as explained, the forward end of the bell crank 126 is rocked upward and the pawl 128 ratchets idly over the serrations on the wheel and when the detail strip frame is restored to its initial position the forward end of the bell crank is rocked downward and this downward movement feeds the detail strip 101 one step through the engagement of the pawl 128 with the serrations of the wheel.

As one of the features of the invention is to accumulate the amounts of the different classes, four sets of totalizer elements are provided. The same denominational elements of each set are grouped together and all the elements as a whole are adapted to be shifted longitudinally to bring the denominational elements of each set into operative alinement with the common actuators for all the sets of elements.

When a transaction key is depressed the detail strip is selected for actuation against its adjacent type bars 60 as explained, and the totalizer elements are shifted by the key into position for the desired totalizer to be thrown into engagement with the actuating slides 32 by the operating mechanism. The devices by which this function of these keys is accomplished are shown in Fig. 8. The pins 12 on the transaction keys coöperate with inclined slots 135 in a detent 136 connected at its upper end by a link 137 to the bar 11 and at its lower end by the pin 139 (Fig. 13) to one end of a bell crank lever 130

140 centrally pivoted on a rod 141 supported by the parallel vertical lugs 142 projecting from the frame of the machine. These slots are inclined inwardly and downwardly with differential inclinations however, so that depression of these keys will lower the detent plate 136 (Figs. 8 and 12) to different extents. The arm 143 of the bell crank 140 at its outer end forms a segmental rack arranged concentric with the pivot 141 of the bell crank lever and meshes with the teeth of a rack 144 carried at the forward end of a lever 145 which is pivoted by a pin 147 to a horizontal lug 146 projecting from the frame of the machine. The rear end of this lever forms an actuating rack 148 similar to that of the arm 143 and meshes with the teeth of a rack 149 integral with a sleeve 150 surrounding a shaft 151.

The totalizer elements 152 are loosely mounted on a shaft 153 which is rigidly mounted in the upper ends of arms 154 fast to the ends of the sleeve 150, and loosely mounted upon the arms 156 which are fast to the shaft 151, the left hand arm 156 being far enough on the outside of the arms 154 to permit sufficient lateral movement of the sleeve to the left on the shaft so that any one of the totalizers may be moved into operative position with the actuating slides 52. The rod 157 is rigid with the outside arms 156 but the inner arms 154 are arranged to slide on this rod. Loosely mounted on the shaft 151 but fast to one of the arms 156 is an arm 158 pivoted at 159 to a pitman 160, adapted to be given a reciprocating movement upon each operation of the machine, as will be hereinafter explained.

When one of the transaction keys is depressed the detent 136 is raised through the engagement of the roller 12 on the key depressed with the edge 133 of its adjacent inclined slot 135, the extent of such movement being dependent upon the angle of inclination of the slot. The lever 145 is thereby swung in a horizontal plane about its pivotal center 147 and the rack 149 being in mesh with the rack 148 on the rear end of this lever shifts the totalizers as a whole and brings those totalizer elements employed to accumulate the amounts of the class to which the depressed key is assigned into position to be rocked into engagement with teeth 162 on the rear edges of the plates 32. When an item is to be entered on the totalizer upon rotation of the main drive shaft 27, but after the slides 32 have been differentially positioned, the totalizer elements are rocked into engagement with the teeth 162 as will be explained and this engagement is maintained until after the plates 32 have been returned to initial position. The locking detent for this bank of keys, which as explained is similar to that employed to lock the amount keys in their depressed position, is raised after the actuating plates have been restored to normal position and springs 163 coiled about the shanks of the keys force the keys to their normal position and thereby through the engagement of the rollers 12 with the forward edges 155 of the slots 135 restores the detent 136, and therefore the totalizer groups to normal position.

There are five transfer devices, one for each of the five banks of amount keys of lower denomination, and the different totalizers of any one set, when the elements are brought into alinement with the actuating plates 32, are simultaneously brought into similar relationship with the transfer mechanism. One of these transfer devices is shown in Figs. 3 and 4 in which 165 and 166 are arms fast to the ends of a sleeve 167 surrounding a shaft 168 which extends longitudinally through the machine. A shaft 169 connects the upper end of the arm 165 with the center of the arm 166, and as these arms are not fast to this shaft they are held apart by a spacing sleeve 170 surrounding the shaft. A transfer pawl 171 is fast to the shaft 169 adjacent the left side of the arm 165 and fast on the right hand end of this shaft, but between the sleeve 170 and the arm 166, is an arm 172 having V shaped notches 173 in its upper edge which are adapted to be engaged by the nose 174ª of a pawl 174 pivoted on the upper end of the arm 166 for the purpose of alining the pawl 171 in its normal or in its tripped position, the spring 175 connected at its ends to the arm 166 and the pawl 174 being employed to firmly hold the end of the pawl 174 in engagement with the notches. A plate 177 is pivoted to a link 178 at 179 and has pivoted adjacent to it on the shaft 180 the trip pawl 181. The rear end of this trip pawl has a tail 182 carrying a finger 183 engaging a notch in a pawl 184 loosely mounted on the plate 177 by the pin 185 and in engagement with the curved end 185ª of the arm 172. Two arms 186, which are loosely mounted upon the totalizer shaft 153 beside the arms 156, are connected to the ends of the shaft 180 upon which the trip pawls 181 of all of the transfer devices are pivoted. The tooth 187 of the totalizer wheels, employed to effect a transfer as the wheels pass from their nine to their zero position, is longer than the other teeth on the wheels. A link 188 has slots 189 at either end and rods 190 supported by the side frames of the machine pass into these slots whereby the link 188 is guided in its reciprocation. There is one link 188 for each transfer device and pawls 191 are mounted by the pins 192 to these links, the pawls being positioned on their respective links in such a way as to suc cessively actuate the transfer pawls from lower to higher denominations as the links are raised. A spring 193 which is under tension, constantly tends to keep the nose 194 of each pawl in engagement with a pin 195 projecting from the corresponding link 188, and the upper end of this pawl 191 is normally in engagement with a rearward projection 196 on the arm 165. A rod 198 is fast to the upper ends of the links 188 is straddled by the bifurcated end of a lever 199 centrally pivoted on a bar 200 extending from the side frame of the machine. A pitman 201 is pivoted to the rear end of this lever 199 and at its lower end is forked over the drive shaft 27. An anti-friction roller 202, projecting from the pitman, rides in a race 203 in the face of the disk 204 journaled to the drive shaft 27.

The operation of the above described transfer mechanism will now be fully explained. Transfers from a totalizer element to an element of the next higher denomination takes place, of course, only during an adding operation. As has been stated, in such an operation the totalizers are not rocked into engagement with the teeth 162 of the slides 32 until after the slides have been differentially positioned so that the totalizer elements are only actuated upon the return movement of the slides and are therefore rotated in a counter clockwise direction (Figs. 1 and 3). As the arms 186 connect the totalizer shaft 153 and the shaft 180 and as this shaft 180 is supported by the plates 177 the latter are rocked about their pivots 179 and the trip pawls 181 are thereby capable of being moved by the totalizers when the totalizers are not in engagement with the actuators just the same as when they are in engagement. When an element has been brought into position requiring a transfer the long tooth 187 engages the forward end of the pawl 181 and rocks it in a clockwise direction thereby rocking the pawl 184 through the engagement of the projection 183 in the notch in the pawl 184. The rear end of the pawl 184 being in engagement with the cam face 185ª of the pawl 172 rocks the pawl in a counter-clockwise direction and thereby prepares the pawl 171 for effective operation, it being fast on the same shaft 169 to which the pawl 172 is fast. After the actuating slides 32 have been restored to initial position the pitman 201, because of the configuration of the cam 203 is given a short downward movement whereby all of the links 188 are given a like extent of movement in an upward direction through the lever 199. Such a movement of each link 188, because of the normal engagement of the pawl 191 pivoted thereon with the projection 196 of an arm 165, rocks the arms 165 and 166 about the shaft 168 and thereby the tripped transfer pawl 171 is given a forward movement and gives the totalizer element of next higher order one unit of movement. The transfer pawl 171 and therefore the pawls 181 and 184 are restored to normal position by the engagement of the face of the next rearward tooth with the under side of the tripped transfer pawl as the latter nears its totalizer pinion and near the end of the one step of movement given the pinion by the pawl.

As stated in the objects, any desired totalizer may be turned to zero and read or reset to zero by operation of the machine which results in printing the total of the classified amounts on the totalizer at the beginning of the operation of the machine and leaving the totalizer at zero or setting the amount printed back upon the totalizer. To provide for such operation, the machine is not only provided with banks of amount and transaction keys, but also with a special "read" and "reset" bank of keys, and these keys and the mechanism which they control will now be described.

Referring to Fig. 5, 207 and 208 designate the "read" and the "reset" keys respectively and these keys comprise the last bank on the left of the machine. A detent 209 is connected at 210 to a link 211 pivoted on the rod 11. The inclined slot 212 extends inwardly and downwardly in the detent so that when the "read" key 207 is depressed the pin 213 thereon engages with the rear edge of this recess and raises the detent. The slot 214, the lower edge of which is engaged by the pin 215 on the "reset" key, is shaped similarly to the slot 212 but its direction is different and such that when the "reset" key is depressed the detent is lowered. This detent is connected at its lower end by a pin 216 to a lever 217 pivoted upon the shaft 40, and has an arm 218 extending downwardly from this shaft. The lower end of this arm carries a laterally projecting pin 219 with which two arms 220 loosely mounted on the pin 221 are normally in engagement. The upper ends of these arms are also normally in engagement with the shaft 40 and are held in this position by the spring 222 connected to the pins 223 on the arms and under tension between them.

The rear arm of the lever 217 has a slot 224 through which a pin 225 passes. This pin projects from the forward end of the plate 226. Arms 227ª and 228ª are fast to the shaft 40 and at their rear ends are provided respectively with slots 230ª and 232ª into which pins 231ª and 233ª pass, the pins being supported by plates 227 and 228 respectively. The plates 226, 227, and 228 for the sake of convenience will be termed as the "adding," the "resetting," and the "reading" cam selecting plates respectively (Figs. 5, 6, and 7). Each of these plates at their rear ends are bifurcated and straddle the drive shaft 27 and near their peripheries have wide slots 229 concentric with the drive shaft 27. The "adding" cam selecting plate 226 has two lugs 230 projecting from the center of either wall of the slot. The "resetting" cam selecting plate 227 has like lugs 231 which project from either side of the lower parts of the slot while the lugs 232 of the "reading" cam selecting plate 228 extend into the upper portion of its slot. Each of these selecting plates has a slot 233 concentric with the shaft 27 and pins 234 projecting laterally from arms 235 loosely mounted adjacent the plates and upon a stub shaft 236 play in these slots. These arms 235 carry laterally projecting rollers 238$^a$, 239$^a$, and 240$^a$ riding in their respective grooves of the "adding" cam 238, "resetting" cam 239, and "reading" cam 240 respectively.

The pitman 160 as explained is pivoted at 159 to the arm 158 which in turn is fast to the shaft 151 on which the totalizer frames are mounted. This pitman 160 carries a laterally projecting pin 237 which passes through the slots 239 in the three cam selecting plates and is of sufficient diameter to pass between the lugs projecting into the slot 229 with but little play. The "adding" cam 238 is so timed that the totalizer elements are not thrown into engagement with the teeth 162 on the slides 32 until after the actuating racks 132 are differentially positioned and they remain in such engaging position until the slides 32 are restored to normal position. The shape of the "resetting" cam 239 is such that at the very beginning of the operation of the machine the totalizer elements are rocked into engagement with the teeth, but it rocks them out of engagement after the slides 32 have been differentially positioned, while the design of the "reading" cam 240 is such that the totalizer pinions are rocked into engagement with the slides 32 at the beginning of the operation of the machine and remain in such position until the slides 32 are restored to initial position. As shown in Fig. 5 the pin 237 extending from the pitman 160 is normally between the lugs 230 projecting into the slot 229 in the adding cam selecting plate 226. It is therefore evident that when the machine is actuated to enter an item on the totalizer and print the amount on the detail strip the "read" or "reset" keys are not depressed and the plate 226 is given a reciprocating movement because of the configuration of the race of the "adding" cam 238 and the pitman 160 is given a like movement whereby the totalizer elements are rocked into engagement with the actuating plates 32 on the return movement of the actuating plates to normal position. To select the "resetting" cam 239 to oscillate the totalizer frame the "reset" key 208 is depressed and the detent 209, through the engagement of the roller on the key with the lower face of the slot 213, is forced downward and thereby, through the rocking of the lever 217 and arms 227$^a$ and 228$^a$, all three cam selecting plates being supported by these members are rocked in a clockwise direction and the lugs 231 projecting into the slot of the selecting plate 227 are brought into operative relation with the pin 237 so that the movement given to the selecting plate 227 will be imparted to the pitman 160 and therefore to the totalizer frame. When it is desired to record the total on a totalizer and set the total back on the totalizer the "read" key is depressed and because the slot 212 in the detent 209 is opposite in direction to the slot 214, the detent is raised and the lever 217 and arms 227$^a$ and 228$^a$ are oscillated in a counter-clockwise direction whereby all of the selecting plates are lowered and the lugs projecting into the slot 229 in the "reading" cam selecting plate 228 are brought into operative relation with the pin 237. It is clear that when one cam is selected to control the time of engagement of the totalizer element with their actuating racks the reciprocation of the selecting plates actuated by the other two cams constitutes an idle movement.

The key locking detent for these "read" and "reset" keys is, as explained in the operation of the locking detent for the amount keys, raised at the end of the operation of the machine, and the keys are restored to normal position by the springs coiled about their shanks. The releasing of the depressed "read" or "reset" keys permits the spring actuated arms 220 to restore the cam selecting plates and the detent 209 to their normal positions through the rocking of the lever 217 and the arms 227$^a$ and 228$^a$ to their normal position.

As no amount key is depressed on a "read" and "reset" operation, means under the control of the "read" and "reset" keys are provided to release a locking arm 250 (Fig. 1) for engagement with the arm 48 supporting the lever 49 so that the actuating slides 32 may be moved through the driving mechanism as otherwise the lever would have a bodily movement with the cam slot arms 37 throughout the entire movement of the latter. Referring again to Fig. 5, 251 designates a link which is pivoted at 11 and which supports a detent 252 which at its lower end, is pivoted at 253 to a lever 254 pivoted on the shaft 34, the rear end of the lever being connected to an arm 255 rigidly mounted on a rock shaft 256 by a link 257. The forward end of arms 258 fast on either end of the shaft 256 within the side frames of the machine carry a laterally extending rod 259 which is normally in engagement with the lower edge of all of the locking arms 250 which are loosely mounted upon the shaft 256. The inclined slots 260 in the detent 252 are so constructed that when one of the keys is depressed its roller 213 engages with the lower face of its respective slot and thereby lowers the detent. This rocks the lever 254 and moves the arms 258 downward and therefore allows the arms 250 to lower so that the roller 261 carried at the forward end of each arm 250 is brought into operative relation with a recess 262 formed between the projection 263 and the arm 48.

It is clear that after these arms 250 are so lowered into locking position with the arms 48 at the beginning of the operation of the machine the actuating slides 32 will be raised, and the extent of movement of these racks is determined by the amount set up on their adjacent totalizer elements and the device by which the locking arms 250 are then taken out of locking position will now be described.

Each arm 265 (Fig. 1), there being one for each totalizer pinion, at its outer end carries a laterally projecting pin 266 and is loosely mounted on the shaft 256 but integral with arms 267 to which the links 178 are pivoted at their upper end. As the totalizer pinions are rocked into engagement with the teeth 162 on the actuating slides 32 at the beginning of each total taking operation of the machine, the totalizer pinions are turned in a clockwise direction, and when the radial face 269 (Figs. 1 and 3) of the long tooth 187 of each pinion abuts the outer end of the corresponding pawl 181 the pawl, plate 177 and link 178 are lowered, this being permitted as the link 178 at its lower end has a slot 271 through which passes a rod 272 supported by the side frame of the machine. The arm 265 is thereby given an upward movement and its corresponding locking arm 250 through the stud 266 is taken out of locking position with the arms 48 and the lever 51 then has no further movement relative to that of the slotted cams 37 during the remainder of the invariable extent of movement of the slotted cams 37.

In a read or reset operation of the machine the totalizer pinions move one step past zero position as an extra step of movement is necessary to lower the transfer mechanism for the purpose of raising the arm 250 out of engagement with the arm 48. As the actuating racks actuate the totalizer element to move this extra step of movement it is obvious that the actuating racks must be also moved an extra unit of movement. In an adding operation the racks cannot receive more than nine units of movement as there are but nine keys limiting the extent of movement of the arm 48 and the movement of the arm from its normal position to the position in which it would be engaged by the nine key constitutes an idle movement. In a total taking operation however the engagement of the roller 261 on the arm 250 with the recess in the arm 48 prevents the arm 48 and therefore the bell crank lever 51 and the driving arm from idly moving this step so that the rack 32 will be moved upon movement of the driving arm 37 from normal position to allow the same to be moved ten steps when the corresponding totalizer wheel is moved from its nine position to one step past its zero position.

As the actuators move an extra step in a total taking operation and as the type wheels are always geared thereto it is evident that the type wheels are moved one step too far in a total taking operation. In order to compensate for this extra step of movement of the type wheels, the platen 115 is moved one step rearward so that an impression of the proper amount may be taken on the type one step to the rear of the normal printing line.

To move the platen this one step rearward in a total taking operation an arm 310 which is fast to one end of the shaft 256 on the outside of the left hand frame of the machine, is connected by a pin 311 to a link 312, the upper end of the link being pivoted by a pin 313 to an arm 314 fast on the shaft 120. When a "read" or "reset" key is depressed in preparing the machine for a total taking operation the shaft 256, as described, is rocked through the medium of the detent 252, lever 254, link 257 and arm 255. The rocking of the shaft 256 through the arm 310, the link 312, and arm 314 rocks the shaft 120 and therefore the arms 302, fast thereto, so that the arms 302, by engagement with the fingers 299 on the platen frames swing the platens against the tension of springs 315 into position to print on the line of type one step back of the normal printing line. The springs 315, which connect the platen frames to the sub-frames 106, are provided to restore the platens to normal printing position. In a "reset" operation the totalizer pinions are turned back one step beyond zero position and upon restoration of the transfer devices, as will be presently described, they are returned to zero positions as the trip pawls 181 remain in engagement with the long tooth 187 of the totalizer has been rocked out of engagement with the actuating racks, since the links 186 connect the totalizer shaft with the pivots 180 of the trip pawls. In a "read" operation the totalizer pinions are returned to register the amount originally standing thereon as the return movement of the actuating slides to normal position is of the same extent as the movement required to turn the totalizer pinions from their original position one step past zero position. In a "read" operation of the machine when a totalizer pinion has nine standing on it, the long tooth, when the amount is restored on the pinion upon the return of the actuating slides 32, engages the trip pawl 181 as the pawl was lowered one step when the pinion was turned one step past zero position. Such engagement trips the pawl and rocks the pawl 184 counter-clockwise without affecting the arm 172 and therefore the transfer pawl 174 as the latter were not lowered with the trip pawl 181. When the trip pawl is raised with the link 178 at the beginning of the next operation of the machine, as will be explained in the next paragraph, the pawls 181 and 184 are restored to untripped position by the engagement of the pawl 184 with the arm 172, the spring 175 having a sufficient tension to prevent such engagement from rocking the transfer pawl 171 from normal position to transferring position at such an operation.

Figure 2:
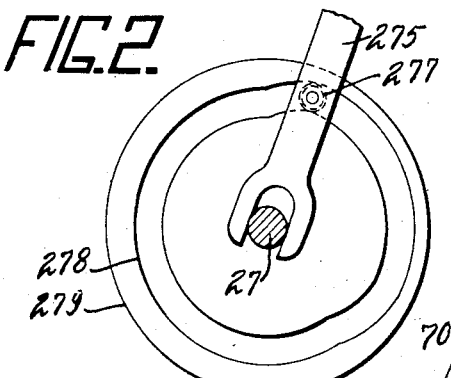
Fig. 2 is a detail of a cam employed to restore the transfer mechanism to its initial position after the total on the totalizer is printed on a record strip.

The transfer mechanism is finally restored to normal position and the device by which this is accomplished is shown in Fig. 1. Two arms 273, one near each end of the shaft, are loosely mounted on the shaft 256 but are integral with arms 274 which, at their outer ends, are connected to pitmen 275 by pins 276. As shown in Fig. 2, each pitman is forked over the drive shaft 27 and has an anti-friction roller 277 which rides in the race 278 of a disk 279 rigidly mounted on the drive shaft 27. A rod 280 mounted in the upper ends of arms 273 extends over arms 281 which are integral with the arms 267 so that when the pitmen 275 are reciprocated at the beginning of the next operation of the machine, the arms 273 will be rocked in a counter-clockwise direction whereby the links 178 will be restored to normal position through the engagement of the rod 280 with the upper edges of the arms 281 integral with the arms 267 to which the links 178 are pivoted.

Operation.

The operation of the various mechanisms of the machine has been explained in connection with the detailed description of the mechanisms, and a brief statement of the general operation of the machine as a whole is thought desirable and will now be given.

To operate the machine for entering items the proper amount keys are depressed, to control the differential movement of the actuating slides 32, and then the proper transaction key is depressed to shift the totalizers as a whole laterally of the actuating plates to bring the totalizer corresponding to the depressed transaction key into operative relation with the actuating plates. The transaction key depressed, by its control over the lateral movement of the sleeve 87 through the external threads on the enlarged portions 89 of the shaft 86 also determines which of the detail strips is to be thrown into contact with the adjacent type carriers 60 by the oscillation of the sleeve 87 carrying the arms 90 one of which engages with the downwardly projecting arm 104 of the selected detail strip frame.

Operation of the machine with the proper amount and transaction keys depressed will result in the differential positioning of the actuating slides 32 and the slide 33 for these various key banks and the movement of the actuators from normal position through the gears 62 and the pinions 66 positions alike the four sets of type bars in the manner described, and at about the completion of the first one-half of the rotation of the drive shaft 27 the printing on the detail strip takes place. Before the return movement of the actuators the selected totalizer will be rocked into engagement with the actuating slides by the reciprocation of the adding cam selecting plate 236 through the cam 238 so that the movement of the actuators will add the amount of the transaction on the selected totalizer.

In operations of the machine for "reading" or "resetting", no amount keys are depressed but instead the desired key of the "reset" and "read" bank. The keys of this bank through the detent 209, lever 217, and the cam selecting plates control the selection of the cams for determining the time of engagement of the selected totalizer with the actuating plates, the transaction keys having selected the totalizer to be rocked into engagement with the actuators for reading or resetting. In both "reading" and "resetting" operations the totalizer wheels are rocked into engagement with the actuating slides 32, before the movement of the slides from normal position and the backward movement of the totalizer wheels one step past zero determines the differential setting of the amount actuators. In "reading" operations the totalizer, because of the configuration of the "reading" cam 240, remains in engagement with the actuating slides while the latter return to their normal position so as to leave the totalizer in its original position, while in resetting operations, the totalizers, through the "reset" cam 239, are disengaged from the actuating slides before the return movement of the latter so as to permit the totalizer wheels to be turned back one step to zero upon restoration of the transfer mechanism by the cam 278. In "reading" or "resetting" operations the type bars 60 are set up in accordance with the movement of the actuators from normal position as in the case of item entering operations, the machine by moving the platen one step to the rear printing the amounts originally standing on the totalizer being read or reset.

The actual transferring operations in an adding operation take place at the very beginning of the succeeding operation of the machine. At the end of "reading" and "resetting" operations the entire transfer mechanism, which was bodily moved downward upon return of the wheels to zero position, are finally restored to normal position through the cam 279, as described.

At the end of the rotation of the drive shaft the depressed keys are released by the raising of the detents 15 through the cam 30, the releasing being accompanied by the final establishment of normal condition in the machine.

While the form of mechanism herein shown and described is admirably adapted to fulfil the objects primarily stated, it is to be understood that it is not intended to confine the invention to the one form of embodiment shown and described herein, as it is susceptible of embodiment in various forms, all coming within the scope of the claims which follow.

What is claimed is:—

1. In a machine of the class described, the combination of a driving member having a constant extent of movement; a differentially movable actuator; a lever connected with the driving member and the actuator and bodily movable by the former without affecting the latter; and selecting manipulative means for differentially limiting the bodily movement of the lever and causing the further movement of the driving member to move the lever about its pivot and actuate the differentially movable actuator.

2. In a machine of the class described, the combination of a plurality of record strip carrying frames; differentially adjustable printing mechanism including a plurality of sets of type carriers corresponding in number to the record strip frames; actuating mechanism for moving the record strip frames to carry their record strips against their type carriers to take impressions therefrom; means for selectively connecting the record strip frames with their actuating mechanism; and means for feeding the record strip carried against its type carriers.

3. In a machine of the class described, the combination of a driving member having a constant movement; a driven member; an oscillatory arm; a lever pivotally carried thereby and connected with the driving and driven member so that movement of the lever with its arm effects no movement of the driven member; and means for differentially limiting the movement of the arm so that further movement of the driving member will swing the lever about its pivot and effect the determined differential movement of the driven member.

4. In a machine of the class described, the combination of a driving member having a constant extent of movement; a driven member; a lever connected with both of said members; an oscillatory arm pivotally carrying said lever and adapted to be moved by the driving member; and means for differentially limiting the movement of the arm so that the further movement of the driving member will swing the lever about its pivotal connection with the arm and actuate the driven member.

5. In a machine of the class described, the combination of a slotted driving member having a constant movement; a slotted actuator; an oscillatory arm; a bell crank pivoted on said arms and having pins on its ends working in the slots of the driving and driven members; and means for differentially limiting the movements of the arm and the pivot of the bell crank, the slot in the driving member being so shaped as to swing the bell crank about its pivot after the movement of the pivot is stopped and through the pin and slot connections with the driven member actuate the latter differentially.

6. In mechanism of the class described, the combination of a slotted driving member, having a constant movement at all operations; a bell crank provided with a pin on one arm working in the slot; an oscillatory arm pivotally carrying the bell crank; a differentially movable actuator having a slot concentric with the axis of the arm; a pin on the other arm of the bell crank working in said slot; and a series of keys adapted when depressed to differentially limit the movement of the arm and to cause the further movement of the driving member to swing the lever about its pivot to move the actuator differentially.

7. In mechanism of the class described, the combination of a driving member having a cam slot; an oscillatory arm; a bell crank pivotally carried by the arm and having a pin on one of its arms coöperating with the cam slot; a differentially movable member having a slot concentric with the pivot of the arm; a pin on the other arm of the bell crank free to move in said slot in the differentially movable member, as the arm and the bell crank are moved about the pivot of the former as a center; and means for differentially limiting the movement of the arm and the pivot of the bell crank whereby to cause the bell crank to be swung about its pivot by further movement of the driving member and through the pin and slot connections with the differentially movable member actuate the latter in accordance with the pivotal movement of the bell crank.

8. In an accounting machine, the combination of a pivoted member having an eccentric slot; means for moving said member to constant extents at all operations; an arm pivoted concentrically with the pivot of said member; a lever pivoted on said arm having a pin on one end coöperating with the slot; a differentially movable actuator; connections between the other end of the lever and the actuator whereby movement of the lever with its arm has no effect upon the differentially movable member but swinging of it about its pivot effects movement of the differentially movable member; and means for stopping the movement of the arm at different points in its travel to cause the movement of the pivoted member through its eccentric slot to swing the lever about its pivot to actuate the differentially movable member in accordance with the remaining movement of the pivoted member.

9. In mechanism of the class described, the combination of a plurality of sets of printing type; a corresponding number of record strip carrying frames; a sleeve adapted to be rocked at each operation; manipulative mechanism; and means controlled thereby for differentially shifting the sleeve longitudinally to operatively connect the same with the desired record strip frame so that the subsequent rocking of the sleeve will rock the engaged frame to take an impression upon its record strip.

10. In mechanism of the class described, the combination of a plurality of record strip carrying frames; a sleeve having arms coöperating with the respective frames; manipulative mechanism having connections controlled thereby for shifting the sleeve differentially to couple it with the desired record strip frame; and means for rocking the sleeve to move the connected record strip frame to take an impression on its strip.

11. In mechanism of the class described, the combination of a plurality of record strip carrying frames; differentially adjustable printing mechanism carrying a plurality of sets of type corresponding in number to the record strip frames; actuating mechanism for moving the record strip frames to carry their record strips against their printing type to take impressions therefrom; and means for selectively connecting the record strip frames with their actuating mechanism.

12. In mechanism of the class described, the combination of a plurality of record strip carrying frames; amount differential mechanism; printing type adjustable by said mechanism; a plurality of totalizers selectively actuable by the amount differential mechanism; a bank of special keys; and connections controlled thereby for engaging the desired totalizer with the amount differential mechanism and for rocking the corresponding record strip frame to bring its strip against the printing type to receive an impression therefrom.

13. In mechanism of the class described, the combination of differential mechanism; a plurality of totalizers selectively actuable therefrom; a corresponding plurality of record strip carrying frames; printing type adjustable from the differential mechanism; means for rocking the frames to carry their strips against the printing type; and means for selecting the totalizer for actuation by the differential mechanism and for operatively connecting a corresponding record strip frame with the record strip frame rocking mechanism whereby the amount entered on the selected totalizer will be printed upon the corresponding record strip.

14. In printing mechanism, the combination of operating mechanism; a plurality of totalizers actuable thereby; a plurality of record strip carrying frames; printing type; means for moving the frames to carry their record strips against the printing type; and means for selecting the totalizer to be actuated and a corresponding record strip frame for printing movement whereby amounts entered in the various totalizers will be classified upon corresponding record strips.

15. In a machine of the class described, the combination of a totalizer comprising a plurality of movable elements; actuators capable of moving said totalizer elements in two directions; a driving means for said actuators; manipulative means for rendering the movement of the driving means effective upon the actuators at different points of the driving members' movement when said totalizer elements are to be moved in one direction by said actuators; and independent manipulative means for rendering the initial movement of said driving member effective upon the actuators when said totalizer elements are moved in the other direction, the totalizer elements being so constructed as to render such movement of the driving member ineffective upon the actuators at different points of movement of the driving members.

16. In a machine of the class described, the combination of a totalizer; an actuator therefor; a driving member for said actuator; a bell crank connected with said member and said actuator and movable by the member; a series of keys for rendering the movement of the bell crank effective upon the actuator at different points of movement of the driving member; and independent manipulative means for rendering initial movement of said bell crank effective upon the actuator, said totalizer being constructed to render movement of the bell crank ineffective upon the actuator at different points of movement of the bell crank when said independent manipulative means is operated.

17. In a machine of the class described, the combination of an accounting device; actuators therefor; driving mechanism for said actuators; type carriers controlled by said actuators for recording items entered upon the accumulator and the totals thereof; manipulative means for rendering the movement of said driving mechanism effective upon the actuators at different points of the movement of the driving mechanism for the entering of items; and independent manipulative means for rendering the initial movement of said driving mechanism effective upon the actuators, upon the entering of totals, said accounting device being so constructed as to render said driving mechanism ineffective upon said actuators at different points of its movement.

18. In a machine of the class described, the combination of a driving member; a driven member; manipulative means for rendering the movement of the former member effective upon the latter member at different points of the former's movement; independent manipulative means for rendering initial movement of said former member effective upon the latter member; and an operated means for rendering the initial movement of said former member ineffective upon the latter member at different points of the former's movement when said independent manipulative means is operated.

19. In a machine of the class described, the combination of an accounting device; an actuator therefor; a driving member having a constant extent of movement; a lever connected with the driving member and the actuator and bodily movable by the former without affecting the latter; manipulative means for differentially limiting the bodily movement of the lever and causing further movement of the driving member to move the lever about its pivot so as to actuate the differentially movable actuator; and a device for causing said lever to be given first an oscillatory movement and subsequently a bodily movement by said driving member, said accounting device being arranged to determine the extent of such oscillatory movement.

20. In a machine of the class described, the combination of an accounting device; an actuator for entering items thereon and for turning the same to zero; a driving member for the actuator; an oscillatory arm; a lever pivotally carried thereby and connected with the actuator and the driving member so that movement of the lever with its arm effects no movement of the driving member; manipulative means for differentially limiting the movement of the arm in item entering operations so that further movement of the driving member will swing the lever about its pivot and effect the determined differential movement of the actuator; a special manipulative device operable in turn to zero operations; and means controlled by said special device for locking said oscillatory arm from movement whereby initial movement of the driving member moves said lever about its pivot to effect differential movement of said actuators, said accounting device being constructed to render said locking means ineffective at different points of movement of the driving member so that movement of the lever with the oscillatory arm effects no further movement of the actuators.

21. In a machine of the class described, the combination of an accounting device; type carriers for recording the items entered on the accounting device and also the totals thereof; an actuator therefor for operating the accounting device in item entering or total taking operations; a driving member having a constant extent of movement; a lever connected with the driving member and the actuator and normally bodily movable by the former without affecting the latter; amount determining manipulative means for differentially limiting the bodily movement of the lever and causing further movement of the driving member to move the lever about its pivot so as to actuate the actuator to enter an item on the totalizer; special manipulative means operable in a total taking operation; a pivoted arm controlled by said special manipulative means for locking said lever against bodily movement upon initial movement of the driving member to move the lever about its pivot so as to actuate the actuators in a total taking operation; and means operated by the accounting device for rendering said locking arms inoperative after the total on the accounting device has been set up on the type carriers so that the lever moves bodily with further movement of the driving member without affecting the actuator.

22. In a machine of the class described, the combination of an accounting device; means for entering items on the accounting device and for turning the same reversely one step past zero position; type carriers adapted to have the items entered on the accounting device and also the totals thereof recorded therefrom on record material; a platen normally in position to take impressions of the items from the type carriers on the record material and constructed to be moved one step from the normal printing line to take an impression of totals on the record material.

23. In a machine of the class described, the combination of an accounting device; actuators for entering items on the accounting device and for turning the same reversely one step past zero position; type carriers controlled by said actuators for recording on record material the items entered on the accounting device, and also the totals thereof when the accounting device is turned one step past zero position; amount determining manipulative means controlling the actuators in item entering operations; special manipulative means controlling the actuators in total taking operations; a platen normally in position to force the record material into contact with the type carriers to record items entered on the accounting device; and means controlled by said special manipulative means in total taking operations for moving the platen into position to force the record material into contact with the type carriers one step to the rear of the normal printing line to compensate for the movement of the accounting device one step past zero position in a total taking operation.

24. In a machine of the class described, the combination of a totalizer; a single set of type carriers for printing both the items entered on the totalizer and the total thereof; means for setting up the type carriers so that in total printing operations the printing line does not coincide with the printing line in item printing operations; a movable platen for taking impressions of items and the totals from the type carriers on record material; and means for moving the platen to take an impression from either of the printing lines in accordance to whether an item or total is to be printed.

25. In a machine of the class described, the combination of a totalizer; type carriers for printing the items entered on the totalizer and the totals thereof; means for setting up the type carriers so that in total printing operations the printing line does not coincide with the printing line in item printing operations; a movable frame carrying record material; means for rocking the frame; a movable platen carried by the frame for taking impressions of items and totals from the type carriers when the frame is rocked; and means for moving the platen to take an impression from either of the printing lines in accordance to whether an item or total is to be printed.

26. In a machine of the class described, the combination with a totalizer, of a set of differentially adjustable arms, elements having a unitary movement with the arms while the arms are being adjusted and movable differentially relative to the arms after the arms are differentially adjusted, a totalizer actuator so connected to each of said elements as to be driven when the element is moved differentially relative to its arm, manipulative devices normally controlling the differential movements of both the arms and elements, and other manipulative devices whereby control of the differential movements of the arms and elements may be transferred to the totalizer.

27. In a machine of the class described, the combination with a totalizer, of a set of differentially adjustable arms, elements having a unitary movement with the arms while the arms are being adjusted and movable differentially relative to the arms after the arms are adjusted, the differential movements of the arms and differential relative movements of the elements invariably combining to a constant value, a totalizer actuator so connected to each element as to be driven during the differential movement of the element relative to its arm, manipulative devices normally controlling the differential movements of both the arms and elements, and other manipulative devices whereby control over the differential movements of the arms and elements may be transferred to the totalizer.

28. In a machine of the class described, the combination with a totalizer, of a set of differentially adjustable arms, elements having a unitary movement with the arms while the arms are being adjusted and movable differentially relative to the arms after the arms are differentially adjusted, a totalizer actuator so connected to each of said elements as to be driven when the element is moved differentially relative to its arm, value keys normally controlling the differential movements of both the arms and elements, and total taking devices whereby control over the differential movements of the arms and elements may be transferred to the totalizer.

29. In a machine of the class described, the combination with a totalizer, of a set of differentially adjustable arms, bell cranks having a unitary movement with the arms while the arms are being adjusted and movable differentially relative to the arms after the arms are differentially adjusted, a totalizer actuator so connected to each of said bell cranks as to be driven when the bell crank is moved differentially relative to its arm, value keys normally controlling the differential movements of both the arms and bell cranks, and total taking devices whereby control over the differential movements of the arms and bell cranks may be transferred to the totalizer.

30. In a machine of the class described, the combination with a totalizer, of a set of differentially adjustable arms, bell cranks pivoted to the arms and having a movement unitary with the arms while the arms are being adjusted, said bell cranks being movable differentially relative to the arms after the arms are differentially adjusted, a totalizer actuator so connected to each of said bell cranks as to be driven when the bell crank is moved differentially relative to its arm, value keys normally controlling the adjustment of the arms and differential relative movements of the bell cranks, a "read" key and a "reset" key, and devices whereby operation of the "read" or "reset" key transfers to the totalizer control over the adjustment of the arms and differential relative movement of the bell cranks.

31. In a machine of the class described, the combination with a totalizer, of a set of differentially movable arms, a bell crank centrally pivoted to each arm and movable differentially on its pivot relative to the arm, totalizer actuators connected to be driven by the bell cranks during movement of the bell cranks around their pivots, keys for controlling the differential movement first of the arms and then of the bell cranks and thereby the totalizer actuators in entering items, normally ineffective devices whereby the totalizer may control the differential movements of the arms and bell cranks, and a "read" and "reset" key for rendering said devices effective.

In testimony whereof I affix my signature in the presence of two witnesses.

HAAKON A. MARTIN.

Witnesses:
R. C. GLASS,
CARL BEUST.